United States Patent
Kuhr et al.

(10) Patent No.: US 8,939,249 B2
(45) Date of Patent: Jan. 27, 2015

(54) VEHICLE HOOD HINGE ASSEMBLY FOR A PEDESTRIAN PROTECTION DEVICE

(71) Applicant: Midway Products Group, Inc., Monroe, MI (US)

(72) Inventors: Jerome J. Kuhr, Monroe, MI (US); Louis J. Achille, Novi, MI (US)

(73) Assignee: Midway Products Group, Inc., Monroe, MI (US)

( * ) Notice: Subject to any disclaimer, the term of this patent is extended or adjusted under 35 U.S.C. 154(b) by 0 days.

(21) Appl. No.: 13/624,019

(22) Filed: Sep. 21, 2012

(65) Prior Publication Data

US 2013/0074284 A1    Mar. 28, 2013

Related U.S. Application Data

(60) Provisional application No. 61/537,864, filed on Sep. 22, 2011.

(51) Int. Cl.
*B60R 21/38* (2011.01)
*E05D 11/00* (2006.01)

(52) U.S. Cl.
CPC ........... *B60R 21/38* (2013.01); *E05D 2011/009* (2013.01); *E05Y 2900/536* (2013.01)
USPC .................... 180/274; 180/69.21; 296/187.04

(58) Field of Classification Search
CPC ................................ B60R 21/38; B60R 21/34
USPC .................. 180/274, 69.21, 69.2; 296/187.04
See application file for complete search history.

(56) References Cited

U.S. PATENT DOCUMENTS

| | | | |
|---|---|---|---|
| 7,854,289 B2* | 12/2010 | Gust | 180/274 |
| 2007/0074919 A1* | 4/2007 | Hirata | 180/69.2 |
| 2007/0151791 A1* | 7/2007 | Gust | 180/274 |
| 2007/0246281 A1* | 10/2007 | Parks | 180/69.2 |
| 2008/0189015 A1* | 8/2008 | Borg et al. | 701/45 |
| 2009/0288271 A1* | 11/2009 | Kmieciak et al. | 16/308 |
| 2009/0289473 A1* | 11/2009 | Kmieciak | 296/193.11 |
| 2010/0024162 A1* | 2/2010 | Walz | 16/233 |
| 2013/0025958 A1* | 1/2013 | McIntyre | 180/274 |

* cited by examiner

*Primary Examiner* — Ruth Ilan
(74) *Attorney, Agent, or Firm* — Barnes & Thornburg LLP

(57) ABSTRACT

A hinge assembly including a vehicle body hinge member configured to be connected with a vehicle body and a hood hinge member configured to be connected with a vehicle hood. The vehicle body hinge member and the hood hinge member are pivotally connected so the hood can be opened for servicing and closed for driving. In one embodiment, a pedestrian protection device includes a bracket movable between an extended position in which a rear portion of the vehicle hood is in an elevated position and a retracted position in which the rear portion of the vehicle hood is in a drivable position. A shear pin extends through the bracket for maintaining the bracket in the retracted position until a threshold force is applied to the bracket. The device includes an actuator configured to apply at least the threshold force to shear the shear pin, thereby moving the bracket to the extended position. A reset latch relocks the bracket in the retracted position after the shear pin has been sheared.

20 Claims, 8 Drawing Sheets

VEHICLE HOOD HINGE ASSEMBLY FOR A PEDESTRIAN PROTECTION DEVICE

RELATED APPLICATIONS

The present application claims the benefit of U.S. Provisional Patent Application, Ser. No. 61/537,864, filed on Sep. 22, 2011, entitled Vehicle Hood Hinge Assembly for a Pedestrian Protection Device, which is hereby incorporated by reference in its entirety.

TECHNICAL FIELD

This invention relates generally to hinge assemblies for vehicle hoods; in particularly, this invention relates to a hinge assembly with a pedestrian protection device that can be reset after an accident.

BACKGROUND AND SUMMARY

For many years, vehicles have had numerous safety features for protecting the vehicle's driver and occupants. More recently, safety devices have been devised to reduce injuries to pedestrians in the event the vehicle collides with a pedestrian. When a pedestrian is struck by a vehicle, one common problem is that the pedestrian tends to be thrown over the vehicle's hood and his/her head impacts the windshield, which can result in debilitating injuries or death.

In an effort to reduce the risk that the pedestrian's head impacts the windshield, pedestrian protection devices have been devised that elevate the rear portion of the hood to absorb the impact of the pedestrian and change the pedestrian's trajectory so their head misses the windshield. One type of this device uses a sensor in the vehicle's bumper to detect a pedestrian impact. When this is detected, an actuator in the pedestrian protection device is deployed that elevates the rear portion of the hood.

After the accident, the hood remains elevated to a position that obstructs the driver's vision through the windshield. The driver needs to reset the rear portion of the hood to drive to a service station so the pedestrian protection device can be replaced. There are existing reset mechanisms that allow the rear portion of the hood to be reset to a closed position after the accident, but these tend to be overly complex and contain numerous components. Moreover, existing reset mechanisms require tight tolerances in machining, which drives up the manufacturing costs. Therefore, there is a need for a new hinge assembly with a pedestrian protection device that can be reset with a less complex mechanism.

According to one aspect, the invention provides a hinge assembly for a vehicle hood. The hinge assembly includes a vehicle body hinge member configured to be connected with a vehicle body and a hood hinge member configured to be connected with a vehicle hood. The vehicle body hinge member and the hood hinge member are pivotally connected so the hood can be opened for servicing and closed for driving. The assembly includes a pedestrian protection device. In one embodiment, the pedestrian protection device includes a bracket movable between an extended position in which a rear portion of the vehicle hood is in an elevated position and a retracted position in which the rear portion of the vehicle hood is in a drivable position. A shear pin extends through the bracket for maintaining the bracket in the retracted position until a threshold force is applied to the bracket. The device includes an actuator configured to apply at least the threshold force to shear the shear pin, thereby moving the bracket to the extended position. A reset latch relocks the bracket in the retracted position after the shear pin has been sheared.

According to another aspect, the invention provides a resettable pedestrian protection device. In one embodiment, the resettable pedestrian protection device includes a bracket movable between an extended position in which a rear portion of the vehicle hood is in an elevated position and a retracted position in which the rear portion of the vehicle hood is in a drivable position. A shear pin extends through the bracket for maintaining the bracket in the retracted position until a threshold force is applied to the bracket. An actuator applies at least the threshold force to shear the shear pin, thereby moving the bracket to the extended position. The device includes a reset latch configured to relock the bracket in the retracted position after the shear pin has been sheared.

According to a further aspect, the invention provides a method for resetting a pedestrian protection device. The method includes the step of actuating a pedestrian protection device of a vehicle in response to detection of a pedestrian collision by elevating a rear portion of the hood. The pedestrian protection device is reset by pushing downward on the elevated rear portion of the hood. For example, the resetting step could be performed by latching a bracket to a latch assembly associated with the pedestrian protection device.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Figure 1:
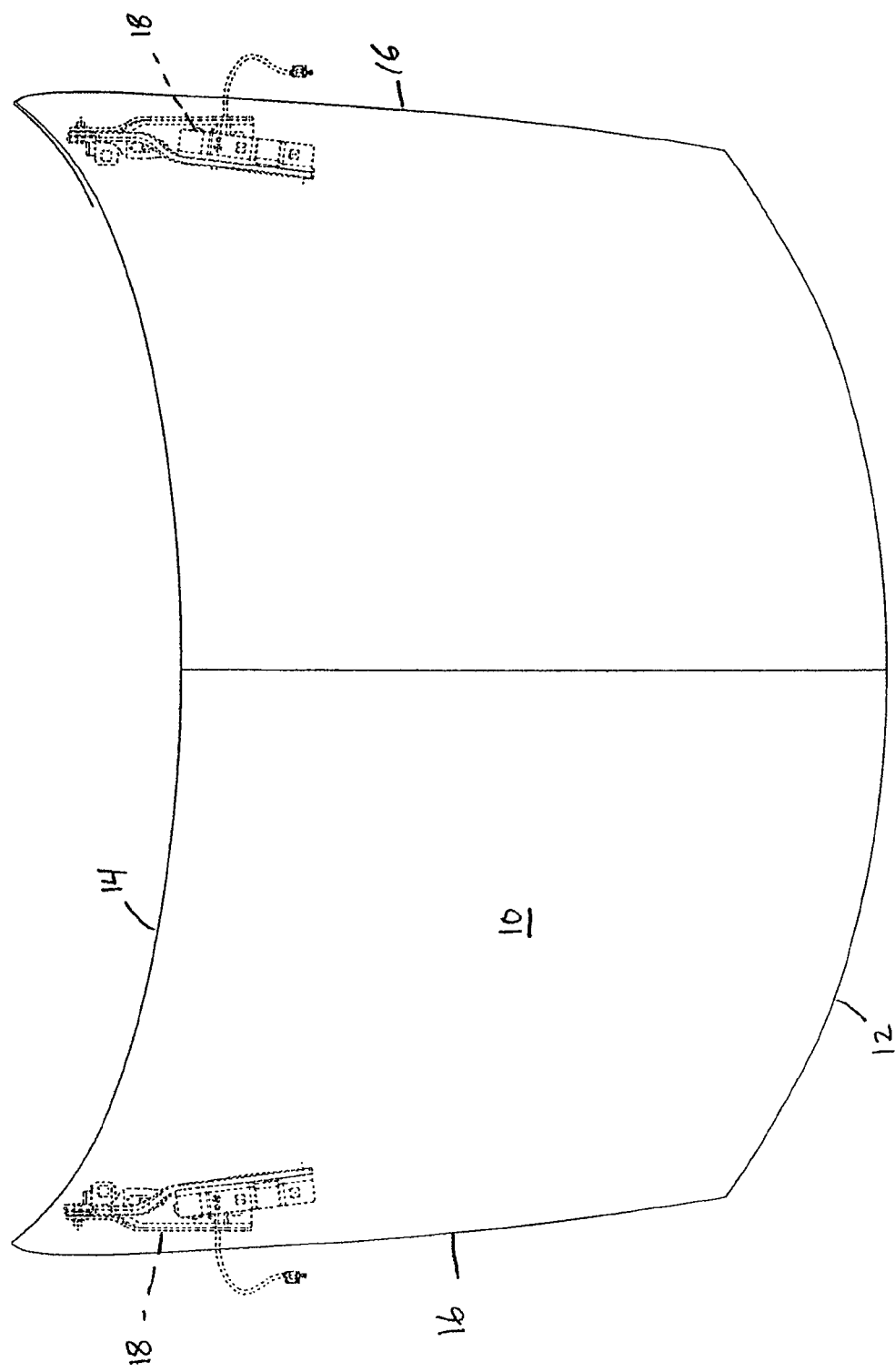
FIG. 1 is a top view of a vehicle hood with an example hinge assembly according to an embodiment of the present invention.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

FIG. 1 shows a top view of a vehicle hood 10. The word "vehicle" is intended broadly to be construed to mean any car, truck, sport utility vehicle, cross-over vehicle, or any other type of transportation device for road use. In the embodiment shown, the hood 10 includes a front portion 12, a rear portion 14 and sides 16. Typically, the front portion 12 of the hood 10 would be proximate the vehicle's bumper and the rear portion 14 would generally be proximate the vehicle's windshield.

One or more hinge assemblies 18 allow the hood 10 to rotate between an open position with the front portion 12 elevated to provide access for servicing the engine and a closed position in which the hood 10 is lowered in a driving position. The term "driving position" or "closed position" refers to a position of the hood that provides an unobstructed view for a driver to drive the vehicle. In the example shown in FIG. 1, the hinge assemblies 18 are positioned such that the hood pivots approximately about the rear end 14 of the hood 10. Embodiments are also contemplated in which the hinge assemblies 18 may be positioned such that the hood 10 rotates about the front end 12. Typically, such as shown in FIG. 1, the hinge assemblies 18 are arranged proximate the sides 16 of the hood 10.

As discussed below, these example hinge assemblies 18 include a pedestrian protection device that actuates in the event the vehicle impacts a pedestrian. When this happens, the pedestrian protection device moves the rear portion 14 of the hood 10 to an elevated position to reduce the possibility of a head impact with the windshield. After the accident, the pedestrian protection device will need to be replaced. For the vehicle to be driven to a service station after the accident, the rear portion 14 of the hood 10 would need to be lowered so the driver can see out the windshield. As discussed below, the hinge assembly 18 includes a reset latch so the rear end 14 of the hood may be locked in a closed position after the accident.

Figure 2:
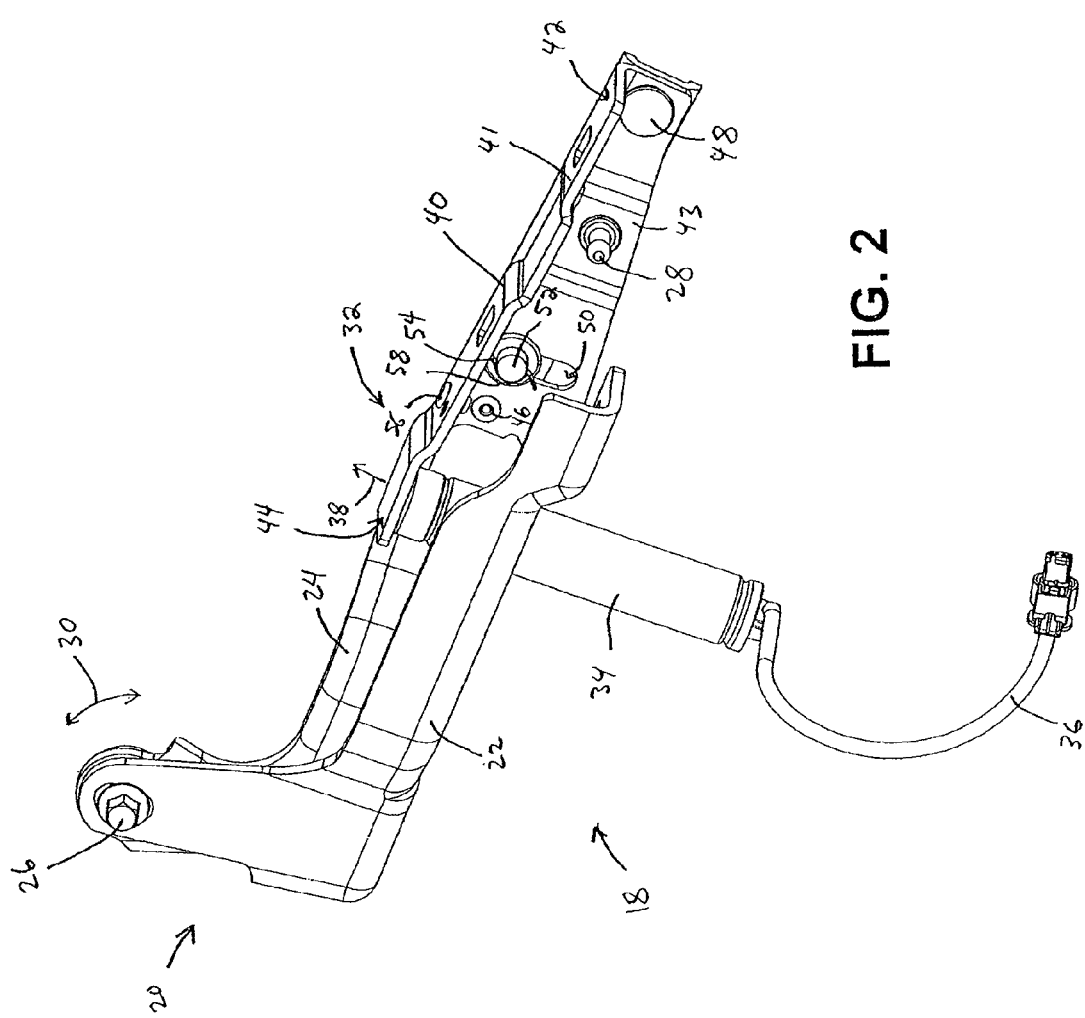
FIG. 2 is a left side perspective view of the example hinge assembly shown in FIG. 1.
Figure 3:
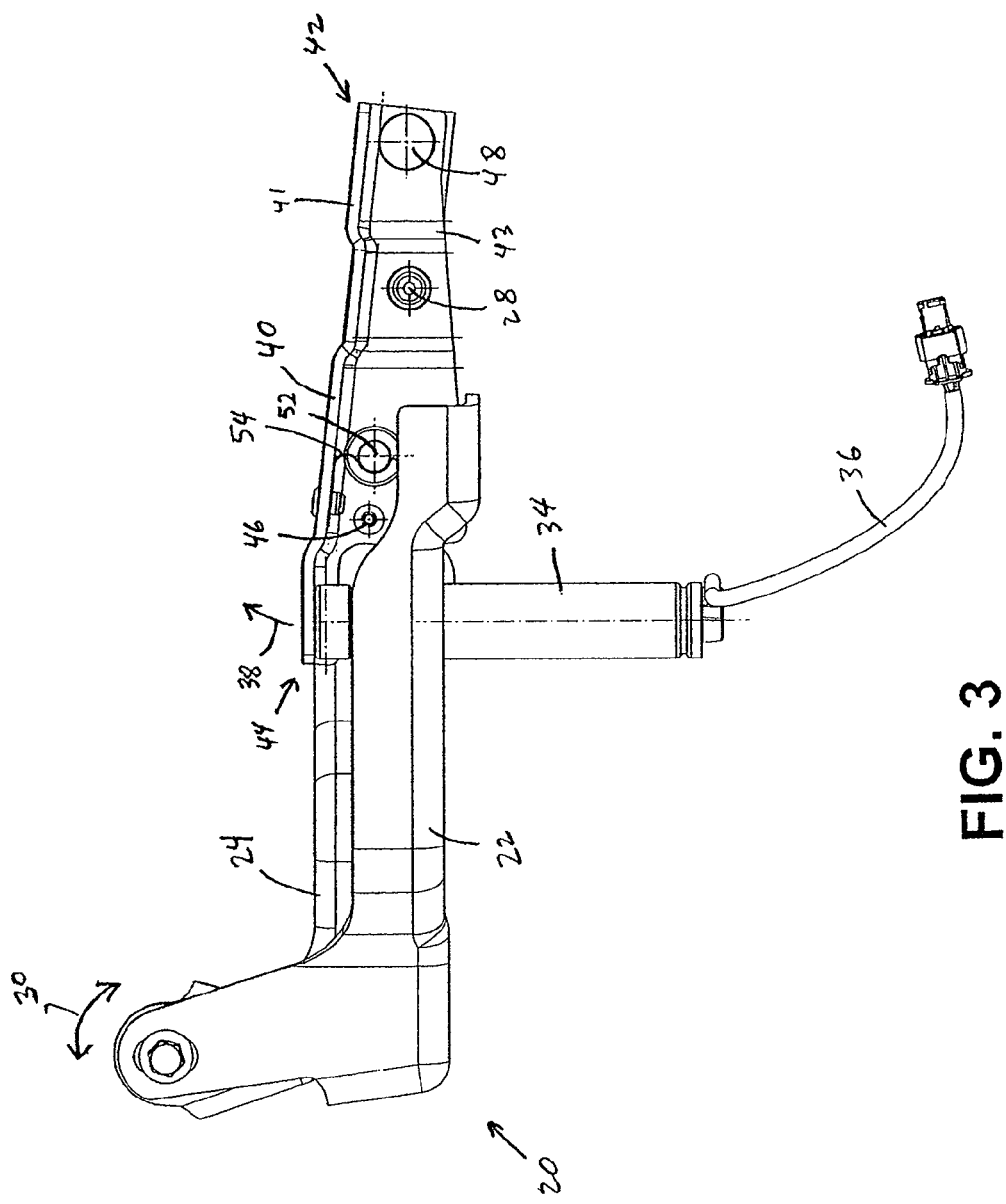
FIG. 3 is a left side view of the example hinge assembly shown in FIG. 2.

FIGS. 2 and 3 show an example hinge assembly 18 that includes a hood hinge 20 with a vehicle body hinge member 22 and a hood hinge member 24. As shown, the vehicle body hinge member 22 is pivotably connected with the hood hinge member 24 using a pivotable connection 26, which is a bolt in this example. In this example, the hood 10 moves between the open and closed positions as shown by arrow 30 via the pivotable connection 26.

An embodiment of the pedestrian protection device 32 can also been seen in FIG. 2. In this embodiment, the pedestrian protection device 32 includes an actuator 34 that could be used to move the rear portion 14 of the hood 10 to the elevated position. In the example shown, the actuator 34 includes an electrical connector 36 that would be in electrical communication with a sensor for detecting impact with a pedestrian, which is often located proximate the vehicle bumper. When a pedestrian impact has been detected, an electrical signal is sent to the actuator 34 to actuate the pedestrian protection device 32. The movement of the actuator 34 in response to this signal causes the rear portion 14 of the hood to rapidly move to the elevated position to protect the pedestrian.

As shown, the pedestrian protection device 32 includes a bracket 40 with a first wall 41 that would be connected to the hood 10 and a second wall 43 connected with the hood hinge member 24. Although this example shows the first wall 41 approximately perpendicular to the second wall 43, other configurations could be used depending on the circumstances. As shown, the bracket 40 has a first end 42 and a second end 44. In this embodiment, the bracket 40 includes a strut connector 28 extending from the second wall for connection of a strut (not shown) to move the hood between its open and closed positions.

A shear pin 46 connects the second wall 43 to the hood hinge member 24 so that the bracket 40 moves concomitant with the hood hinge member 24 prior to activation. When the pedestrian protection device 32 is activated, the force of the actuator 34 shears the shear pin 46 such that the bracket 40 pivots about a pivot pin 48 to elevate the rear portion 14 of the hood 10.

The second wall 43 of the bracket 40 defines a slot 50 that receives an upstop pin 52. The upstop pin 52 limits the pivoting motion of the bracket 40 after actuation. In other words, in the embodiment shown, the lower surface of the slot 50 interferes with the upstop pin 52 to limit pivoting movement of the bracket 40.

In the embodiment shown, a latch member 54 can be used to maintain the bracket 40 in the closed position after an accident. As shown, the latch includes a first end connected to the first wall 41 of the bracket 40 with a fastener 56 and a second end extending from the first wall 41. The extending portion of the latch member 54 includes a detent 58 for locking the upstop pin 52 after an accident.

In order to release the pin from the detent 58, the spring force of the latch member 54 would need to be overcome. The latch member 54 is configured such that the force applied by the actuator 34 is greater than the spring force of the latch member 54 and therefore the latch member 54 does not restrict the upstop pin 52 from being released when the actuator 34 is activated. Typically, the latch member 54 has a spring force selected so the upstop pin 52 can be reset in the detent 58 by the force of the driver pushing downward on the rear portion 14 of the hood 10 and then the driver can drive to a service station to have the pedestrian protection device 32 replaced. The spring force of the latch member 54 is sufficient to lock the upstop pin 52 in the detent 58 to prevent the hood 10 from obstructing the driver's view.

A feature in this embodiment is the configurability of the latch member 54. For example, the force with which the latch member 54 locks the upstop pin can be easily customized, such as by changing the spring force of the latch member 54. Embodiments are contemplated in which other types of latching devices could be used to lock and release the upstop pin 54 at a desired force. For example, in some cases more than one latch member could be provided that work together to capture the upstop pin 52. In other embodiments, the upstop pin 52 may include a magnetic portion that cooperates with a magnetic portion in the latch member 54 to reset the hood 10 to the closed position.

Figure 4:
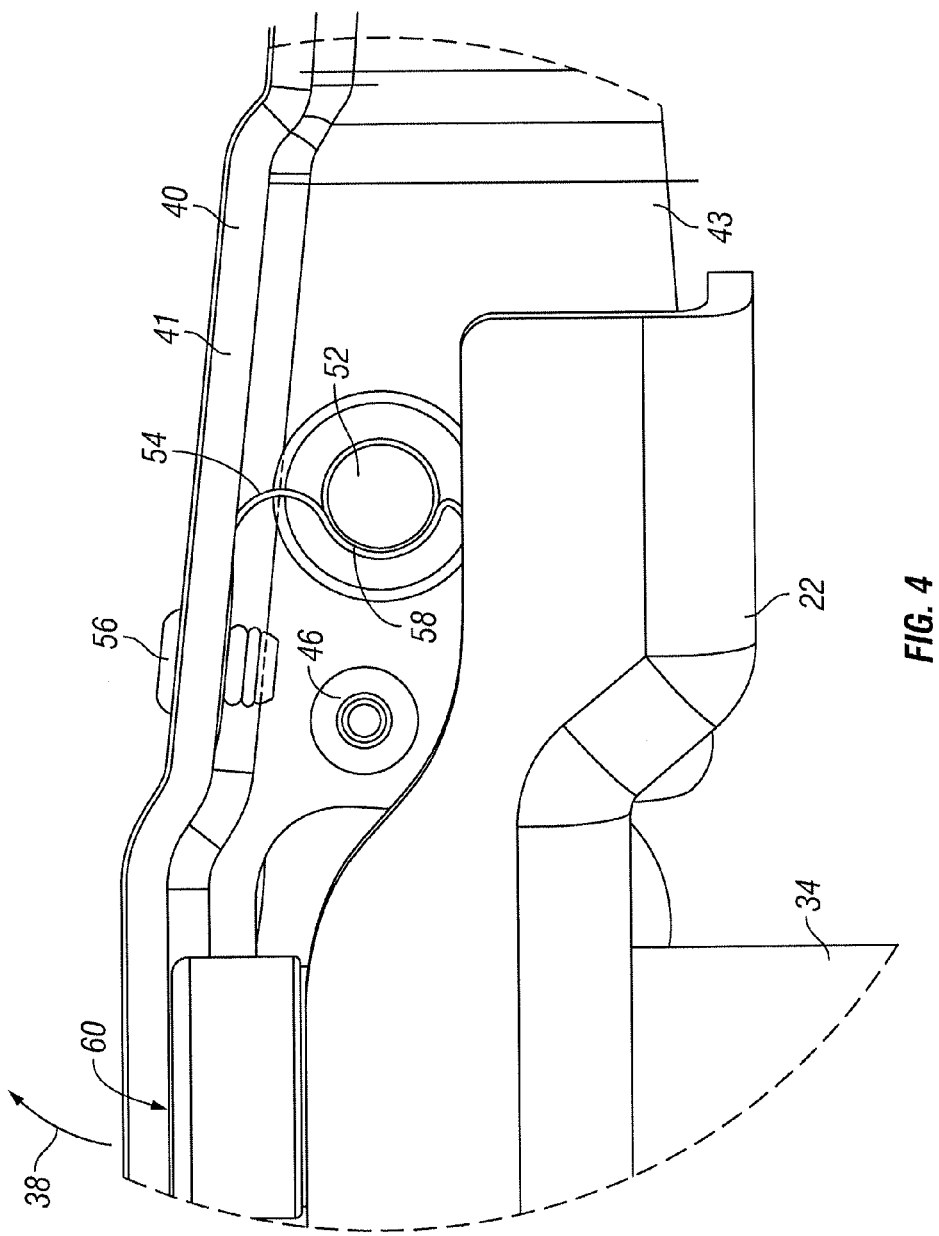
FIG. 4 is a detailed left side view of pedestrian protection device shown in FIG. 3.
Figure 5:
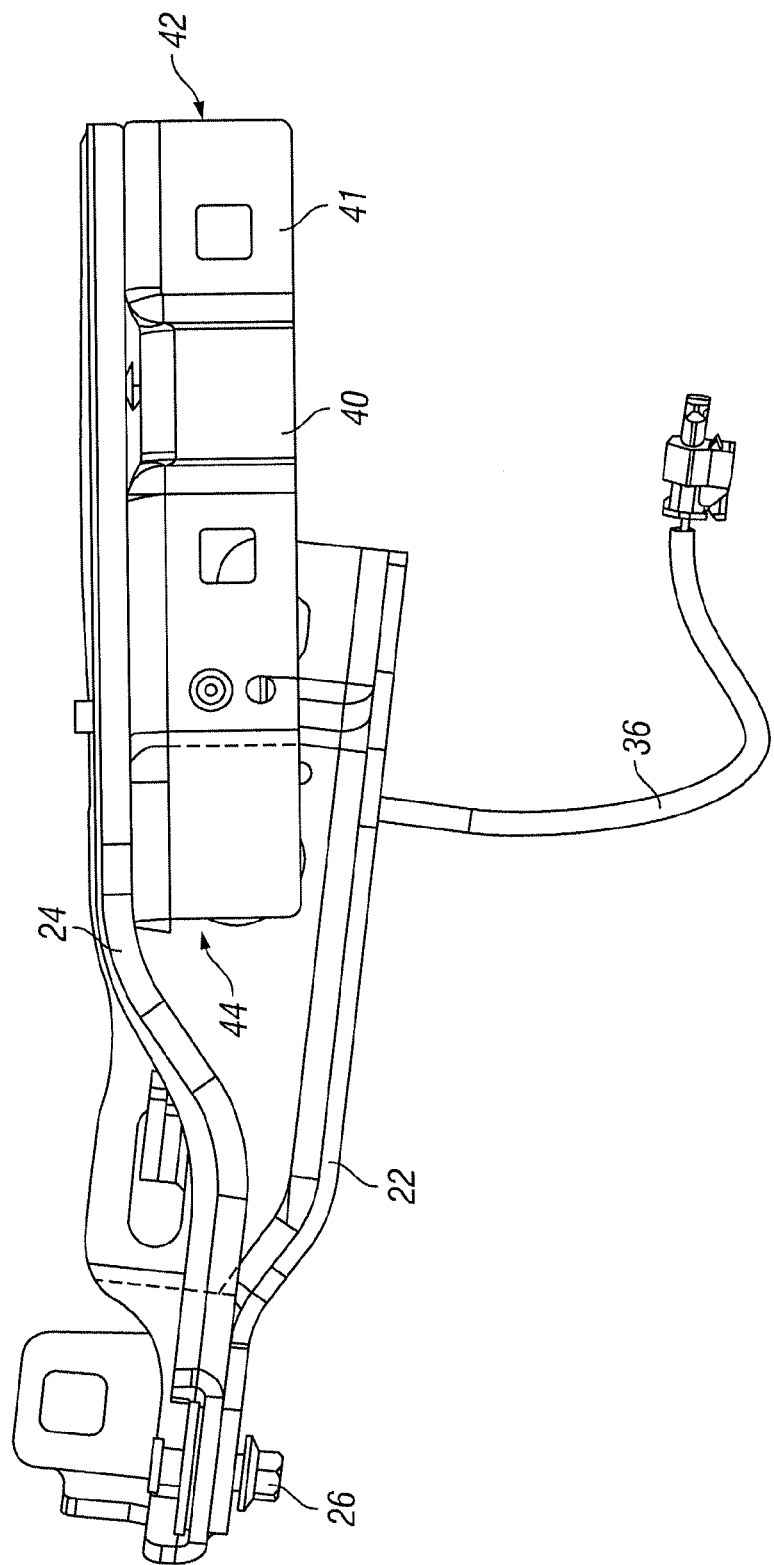
FIG. 5 is a top view of the example hinge assembly shown in FIG. 2.
Figure 6:
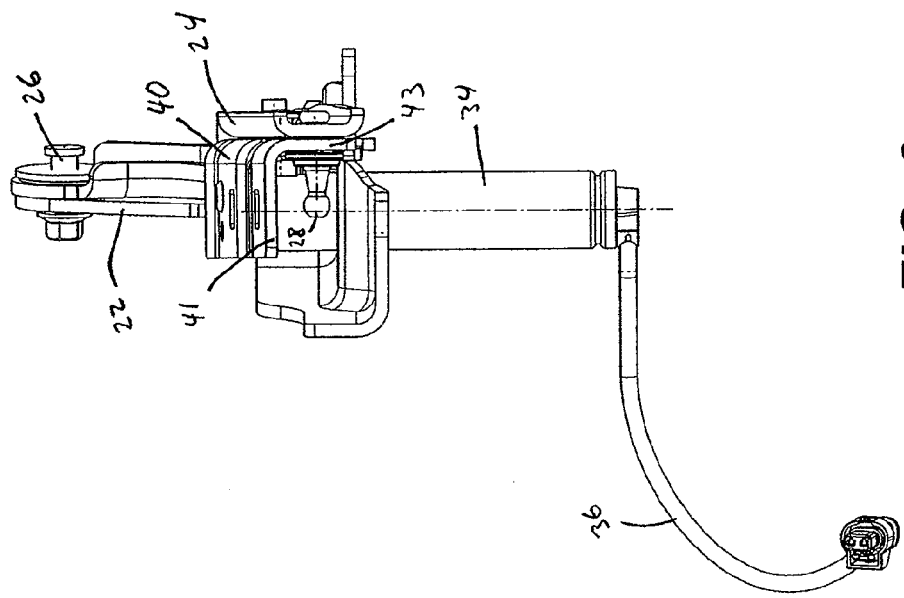
FIG. 6 is a front view of the example hinge assembly shown in FIG. 2.

FIG. 4 shows a detailed side view of the pedestrian protection device 32 shown in FIGS. 2 and 3. In the example shown, the actuator 34 includes a top portion 60 that is adjacent to the lower side of the bracket 40. When the actuator 34 is activated, the force of the actuator 34 on the first wall 41 of the bracket 40 shears the shear pin 46. This force also overcomes the spring force of the latch member 54 so the upstop pin 52 is released from the detent 58. This moves the second end 44 of the bracket 40 in the direction of arrow 38, which elevates the rear portion 14 of the hood to reduce the potential for the pedestrian's head to impact the windshield. The slot 50 and upstop pin 52 limits movement of the bracket 40. After the accident, the vehicle is undriveable until the hood 10 is reset to a driving position due to the hood's rear portion 14 being in an elevated position, which obstructs the vision of the driver. The driver may reset the hood 10 by pushing downward on the rear portion 14, which overcomes the spring force of the latch member 54 and resets the upstop pin 52 in the detent 58. The detent 58 locks the upstop pin 52 to prevent movement of the hood 10 to an elevated position, which would obstruct the driver's vision. FIGS. 5 and 6 show top and front views of the example hinge assembly 18, respectively.

Figure 7:
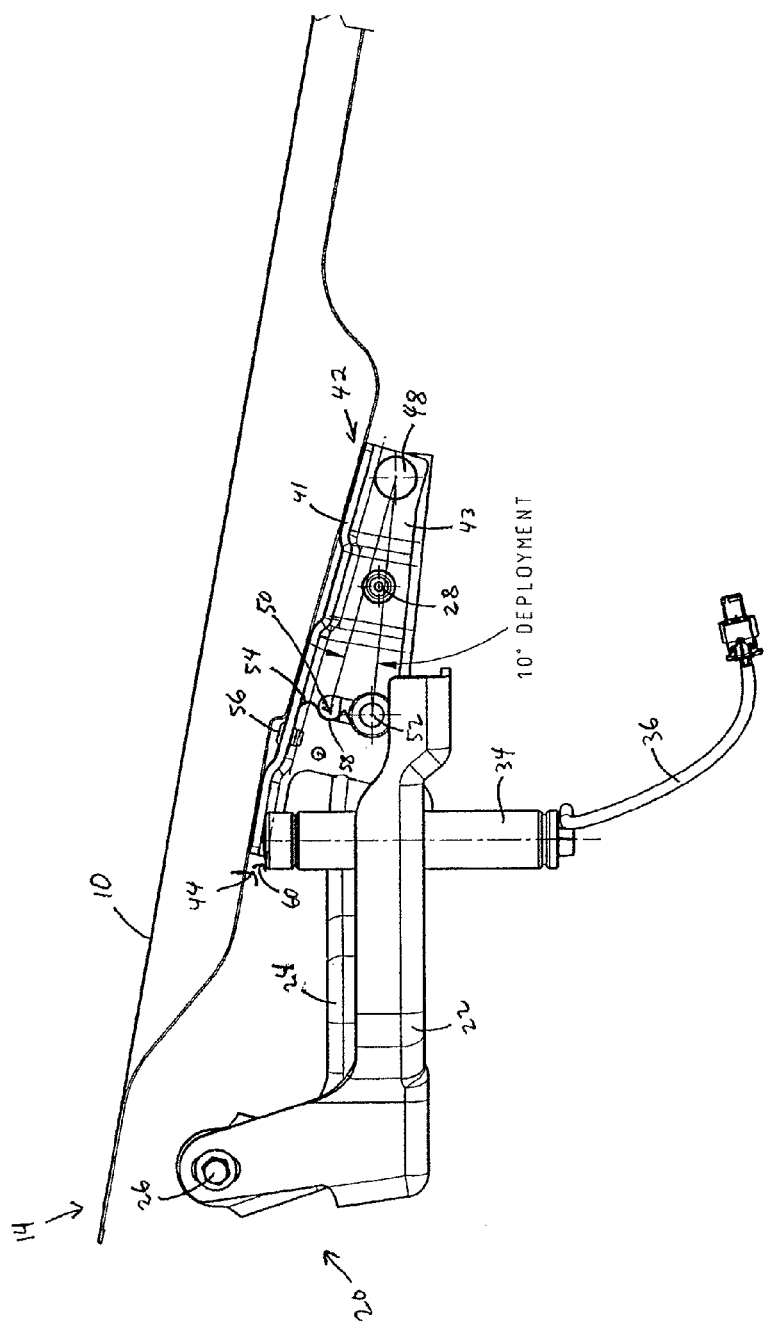
FIG. 7 is a left side view of the example hinge assembly shown in FIG. 2 after the actuator has deployed.
Figure 8:
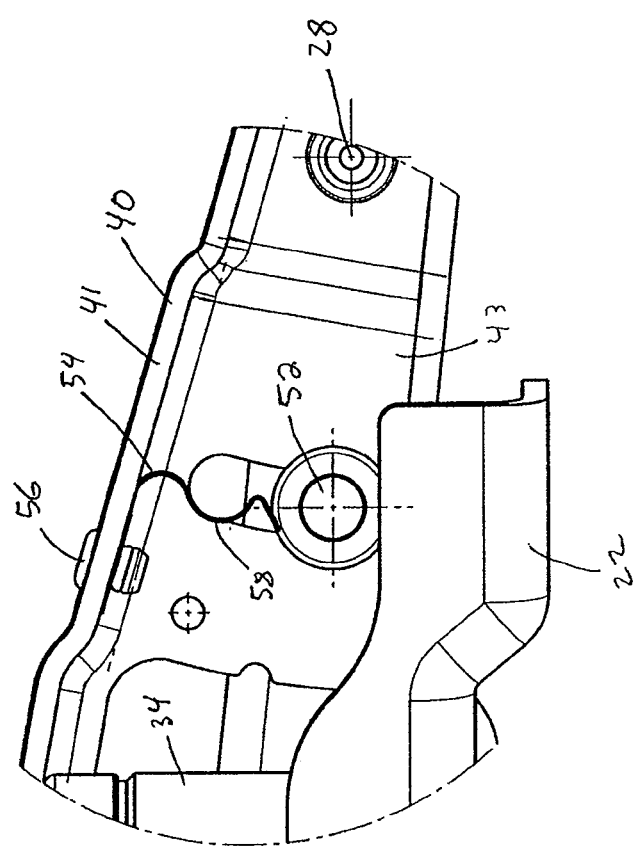
FIG. 8 is a detailed left side view of the pedestrian protection device shown in FIG. 7.

FIGS. 7 and 8 show the example hinge assembly 18 after the actuator 34 has been activated. As can be seen, the top end 60 of the actuator 34 has moved upward, applying a force to the second end 44 of the bracket 40. This force shears the shear pin 46 so the bracket 40 pivots about the pivot pin 48, which elevates the rear portion 14 of the hood 10 to reduce the likelihood of the pedestrian's head impacting the windshield. The activation of the actuator 34 also releases the upstop pin 52 from the detent 58. The slot 50 limits the travel of the upstop pin 52, which limits the upward movement of the bracket 40. In this example, the slot 50 is dimensioned such that the bracket 40 pivots approximately 10 degrees. However, other embodiments are contemplated in which the slot 50 could be configured to provide more or less travel of the bracket 40. As discussed above, the hood 10 may be reset by pushing downward such that the upstop pin 52 is captured in the detent 58. This will allow the hood 10 to be locked in a closed position until the driver can get to a service station to have the pedestrian protection device 32 replaced.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A hinge assembly for a vehicle hood, the hinge assembly comprising:
    a vehicle body hinge member configured to be connected with a vehicle body;
    a hood hinge member configured to be connected with a vehicle hood;
    a pivotal connection pivotally connecting the vehicle body hinge member and the hood hinge member;
    a pedestrian protection device comprising:
    a bracket movable between an extended position in which a rear portion of the vehicle hood is in an elevated position and a retracted position in which the rear portion of the vehicle hood is in a drivable position;
    a shear pin extending through the bracket for maintaining the bracket in the retracted position until a threshold force is applied to the bracket,
    an actuator configured to apply at least the threshold force to shear the shear pin thereby moving the bracket to the extended position;
    a reset latch configured to relock the bracket in the retracted position after the shear pin has been sheared; and
    a pin extending from the bracket, wherein the latch locks the pin to maintain the bracket in the retracted position.

2. The hinge assembly of claim 1, wherein the latch includes a detent for locking the pin.

3. The hinge assembly of claim 1, wherein the latch is a spring.

4. The hinge assembly of claim 3, wherein the latch is a continuous member that has been bent to form the spring.

5. The hinge assembly of claim 4, wherein the latch is metal.

6. The hinge assembly of claim 3, wherein the latch is a unitary metallic member that has been bent to form the spring.

7. The hinge assembly of claim 1, wherein the latch is configured to lock the bracket in the retracted position unless at least the threshold force is applied to the bracket.

8. The hinge assembly of claim 1, wherein the bracket defines a slot through which the pin extends through.

9. The hinge assembly of claim 8, wherein the pin limits pivotal movement of the bracket in an extended position.

10. A resettable pedestrian protection device comprising:
    a bracket movable between an extended position in which a rear portion of the vehicle hood is in an elevated position and a retracted position in which the rear portion of the vehicle hood is in a drivable position;
    a shear pin extending through the bracket for maintaining the bracket in the retracted position until a threshold force is applied to the bracket;
    an actuator configured to apply at least the threshold force to shear the shear pin thereby moving the bracket to the extended position;
    a reset latch configured to relock the bracket in the retracted position after the shear pin has been sheared; and
    a pin extending from the bracket, wherein the latch locks the pin to maintain the bracket in the retracted position.

11. The resettable pedestrian protection device of claim 10, wherein the latch includes a detent for locking the pin.

12. The resettable pedestrian protection device of claim 10, wherein the latch is a spring.

13. The resettable pedestrian protection device of claim 12, wherein the latch is a continuous member that has been bent to form a spring.

14. The resettable pedestrian protection device of claim 13, wherein the latch is metal.

15. The resettable pedestrian protection device of claim 14, wherein the latch is a unitary metallic member that has been bent to form the spring.

16. The resettable pedestrian protection device of claim 10, wherein the latch is configured to lock the bracket in the retracted position unless at least the threshold force is applied to the bracket.

17. The resettable pedestrian protection device of claim 10, wherein the bracket defines a slot through which the pin extends through.

18. The resettable pedestrian protection device of claim 17, wherein the pin limits pivotal movement of the bracket in an extended position.

19. A method for resetting a pedestrian protection device, the method comprising the steps of:
    actuating a pedestrian protection device of a vehicle in response to detection of a pedestrian collision by elevating a rear portion of the hood;
    resetting the pedestrian protection device by pushing downward on the elevated rear portion of the hood;
    wherein the resetting step involves the step of latching a bracket to a latch assembly associated with the pedestrian protection device; and
    wherein the latch assembly is a continuous member that has been bent to form a spring.

20. The method of claim 19, wherein the latch assembly includes a detent portion.

* * * * *